United States Patent
Siu et al.

(10) Patent No.: US 11,714,676 B2
(45) Date of Patent: Aug. 1, 2023

(54) SOFTWARE-DIRECTED VALUE PROFILING WITH HARDWARE-BASED GUARDED STORAGE FACILITY

(71) Applicant: International Business Machines Corporation, Armonk, NY (US)

(72) Inventors: Joran S. C. Siu, Thornhill (CA); Irwin D'Souza, Toronto (CA); Filip Jeremic, Hamilton (CA); Aleksandar Micic, Ottawa (CA); Evgenia Badiyanova, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 16/734,083

(22) Filed: Jan. 3, 2020

(65) Prior Publication Data
US 2021/0208927 A1    Jul. 8, 2021

(51) Int. Cl.
*G06F 9/46* (2006.01)
*G06F 9/48* (2006.01)
*G06F 9/445* (2018.01)

(52) U.S. Cl.
CPC ........ *G06F 9/4812* (2013.01); *G06F 9/44557* (2013.01)

(58) Field of Classification Search
CPC .... G06F 9/4812; G06F 9/44557; G06F 11/34; G06F 11/3466; G06F 11/3471;
(Continued)

(56) References Cited

U.S. PATENT DOCUMENTS

| 5,446,876 A * | 8/1995 | Levine ................. G06F 9/3863 |
| | | 714/E11.2 |
| 6,513,155 B1 * | 1/2003 | Alexander, III .... G06F 11/3409 |
| | | 717/124 |

(Continued)

FOREIGN PATENT DOCUMENTS

JP    2002055845 A  *  2/2002

OTHER PUBLICATIONS

Kumar et al., "Low Overhead Program Monitoring and Profiling", PASTE'05, Sep. 5-6, 2005, Lisbon, Portugal, https://dl.acm.org/citation.cfm?id=1108801.
(Continued)

*Primary Examiner* — Emerson C Puente
*Assistant Examiner* — Zhi Chen
(74) *Attorney, Agent, or Firm* — Garg Law Firm, PLLC; Rakesh Garg; Michael O'Keefe

(57) ABSTRACT

A value profiling method, system and computer program product that leverages a guarded storage facility. During code execution, a first instruction is loaded. The first instruction has a first value designating a first region of memory and the first instruction is related to a first section of the code. A determination is made as to whether a guarded mode is enabled at the first region. Responsive to an enabled guarded mode at the first region, a secondary operation is triggered. The secondary operation is in addition to a primary operation of the first instruction. The primary operation is relative to the first region of the memory. The secondary operation causes a profiling of the first section of the code.

20 Claims, 10 Drawing Sheets

(58) Field of Classification Search
CPC .. G06F 11/36; G06F 11/3604; G06F 11/3612; G06F 11/3003; G06F 11/302; G06F 11/3037; G06F 11/3034; G06F 2201/865; G06F 2201/86; G06F 2201/88

See application file for complete search history.

(56) References Cited

U.S. PATENT DOCUMENTS

| | | | | |
|---|---|---|---|---|
| 7,895,581 | B2* | 2/2011 | LaFrance-Linden | G06F 11/3476 717/130 |
| 8,225,053 | B1* | 7/2012 | McCorkendale | G06F 12/08 711/159 |
| 8,612,730 | B2 | 12/2013 | Hall et al. | |
| 8,813,055 | B2 | 8/2014 | Kosche | |
| 9,419,621 | B1* | 8/2016 | Rohleder | G06F 11/34 |
| 9,436,575 | B2 | 9/2016 | Chowdhury et al. | |
| 9,811,452 | B2 | 11/2017 | Sule et al. | |
| 11,226,908 | B2* | 1/2022 | Riley | G06F 12/1483 |
| 2003/0131225 | A1* | 7/2003 | Bradley | G06F 15/177 713/2 |
| 2005/0066306 | A1* | 3/2005 | Diab | G06F 8/34 707/999.103 |
| 2005/0086650 | A1* | 4/2005 | Yates, Jr. | G06F 9/45533 717/139 |
| 2005/0240793 | A1* | 10/2005 | Safford | G06F 9/30181 714/1 |
| 2007/0079050 | A1* | 4/2007 | Reckless | G06F 21/80 711/100 |
| 2008/0320459 | A1* | 12/2008 | Morris | G06F 9/526 717/162 |
| 2009/0013124 | A1* | 1/2009 | Itkin | G06F 9/32 711/103 |
| 2009/0187991 | A1* | 7/2009 | Freericks | G06F 21/57 726/24 |
| 2009/0222646 | A1* | 9/2009 | Ohba | G06F 11/3636 712/E9.082 |
| 2010/0169579 | A1* | 7/2010 | Sheaffer | G06F 12/0831 711/119 |
| 2010/0333071 | A1* | 12/2010 | Kuiper | G06F 11/3466 717/130 |
| 2013/0262806 | A1* | 10/2013 | Tindall | G06F 12/1458 711/163 |
| 2014/0089942 | A1 | 3/2014 | Newburn et al. | |
| 2014/0351472 | A1* | 11/2014 | Jebson | G06F 9/4818 710/269 |
| 2015/0347263 | A1* | 12/2015 | Chau | G06F 11/3644 717/130 |
| 2017/0228525 | A1* | 8/2017 | Wajs | H04N 21/2541 |
| 2018/0121644 | A1* | 5/2018 | Baker | G06F 21/51 |
| 2018/0167361 | A1* | 6/2018 | Xiao | H04L 63/1458 |
| 2018/0181755 | A1* | 6/2018 | Li | G06F 9/30061 |
| 2018/0203697 | A1* | 7/2018 | Greiner | G06F 9/3802 |
| 2018/0232519 | A1* | 8/2018 | Lin | H04L 9/0894 |
| 2018/0300150 | A1* | 10/2018 | Gschwind | G06F 9/30043 |
| 2018/0330097 | A1* | 11/2018 | Dietsch | G06F 30/33 |
| 2018/0349603 | A1* | 12/2018 | Yamada | G06F 21/554 |
| 2019/0087566 | A1* | 3/2019 | Hosie | G06F 21/552 |
| 2019/0102525 | A1* | 4/2019 | Vaishnav | G06F 21/31 |
| 2019/0340097 | A1* | 11/2019 | Williams | G06F 11/3495 |
| 2020/0004662 | A1* | 1/2020 | Mola | G06F 11/3037 |
| 2021/0334019 | A1* | 10/2021 | Grisenthwaite | G06F 3/0655 |

OTHER PUBLICATIONS

Moseley et al., "Shadow Profiling: Hiding Instrumentation Costs with Parallelism", Code Generation and Optimization, 2007. CGO '07, https://ieeexplore.ieee.org/abstract/document/4145115.

Iima et al., Multi-Objective Reinforcement Learning for Acquiring All Pareto Optimal Policies Simultaneously—Method of Determining Scalarization Weights, 2014 IEEE International Conference on Systems, Man, and Cybernetics Oct. 5-8, 2014.

D'SOUZA, "How Concurrent Scavenge using the Guarded Storage Facility Works", 2017, https://developer.ibm.com/javasdk/2017/09/25/concurrent-scavenge-using-guarded-storage-facility-works/.

List of all IBM related dockets. Appendix P. 2019.

* cited by examiner

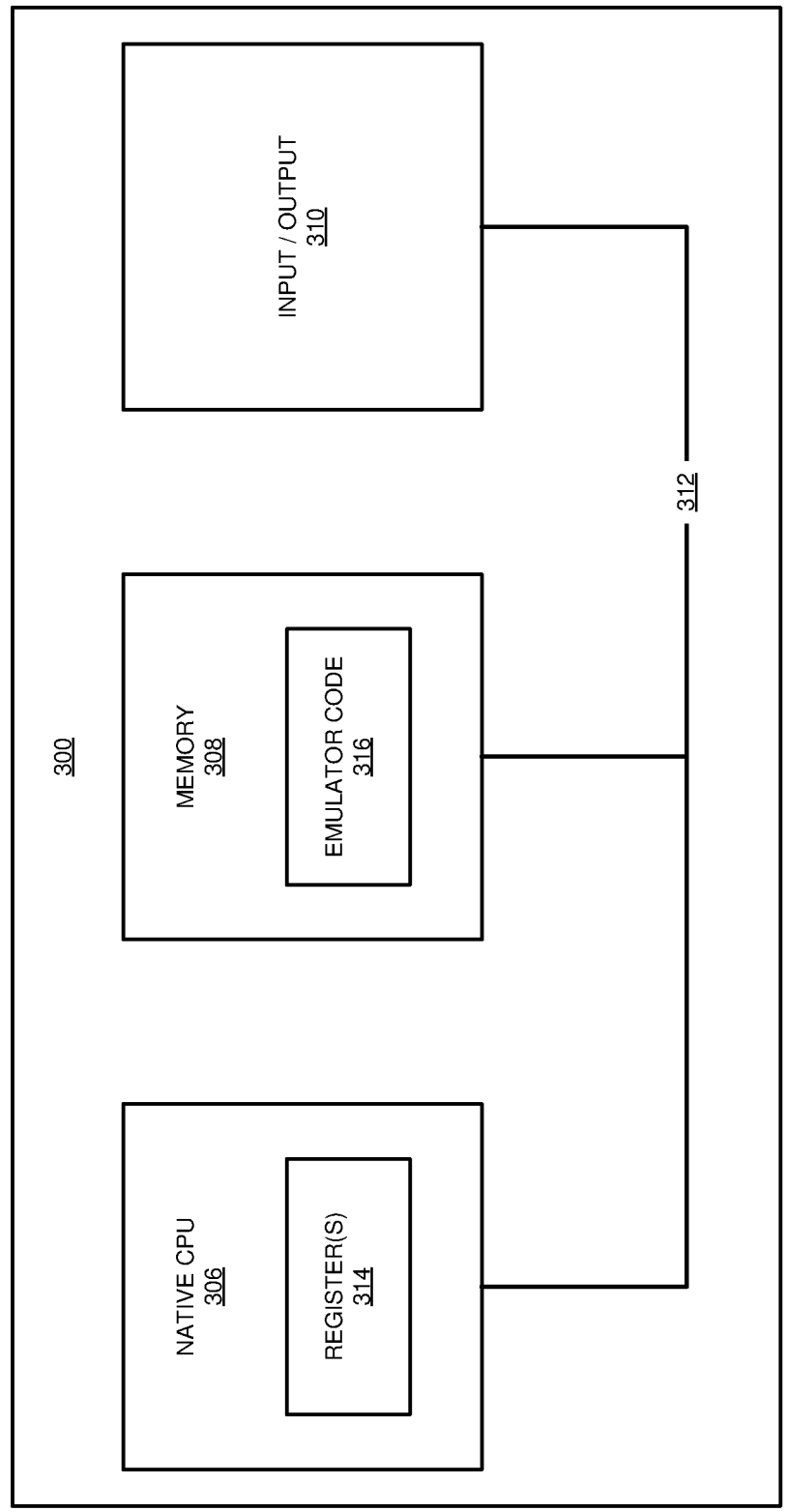

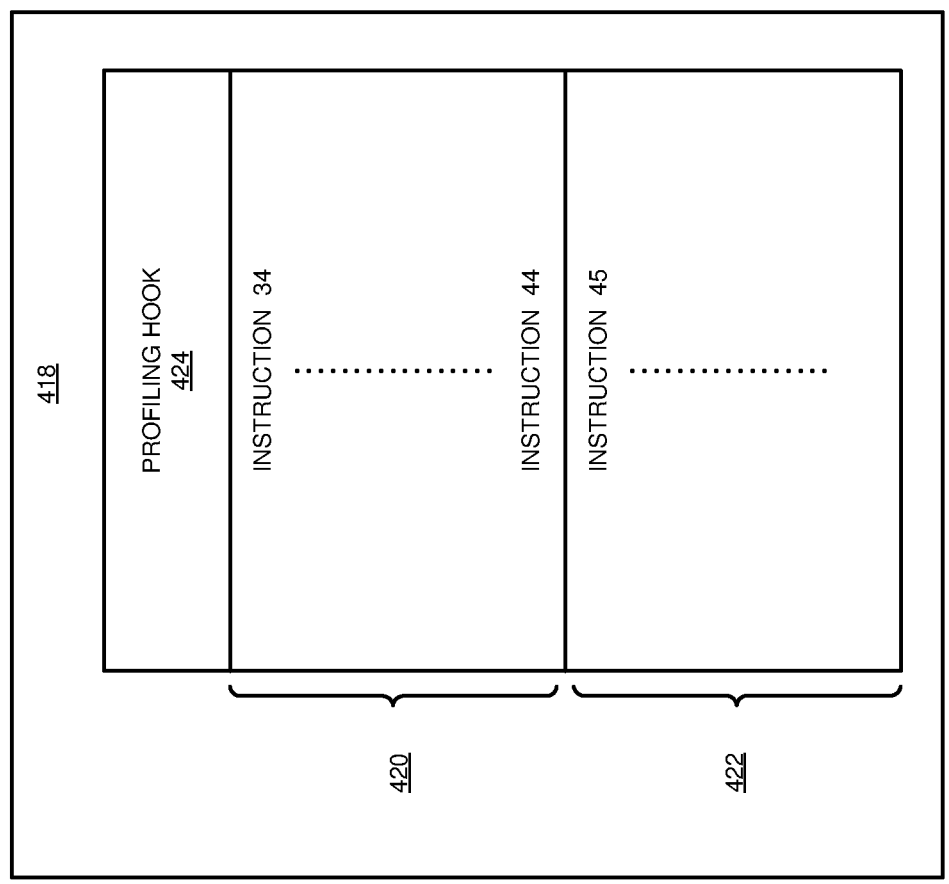

SOFTWARE-DIRECTED VALUE PROFILING WITH HARDWARE-BASED GUARDED STORAGE FACILITY

TECHNICAL FIELD

The present invention relates generally to a method, system, and computer program product for value profiling. More particularly, the present invention relates to a method, system, and computer program product for software-directed value profiling with a hardware-based guarded storage facility.

BACKGROUND

Software profiling is a form of dynamic program analysis that measures, for example, the space (memory) or time complexity of a program, the usage of particular instructions, or the frequency and duration of function calls. Most commonly, profiling information serves to aid program optimization. Profiling is achieved by instrumenting either the program source code or its binary executable form using a tool called a profiler or code profiler. Profilers employ a variety of techniques to collect data, including hardware interrupts, code instrumentation, instruction set simulation, profiling hooks, A profiling hook is an instruction, either in a higher level language of the source code or an executable instruction in a suitable form depending upon the specific implementation, designed to invoke, as a result of executing the instruction, an operation relating to profiling a portion of code that is expressly or implicitly identified by the instruction.

A Guarded Storage (GS) Facility is a hardware-based feature that allows a program to guard or monitor region(s) in memory, such that performing a load of a reference to a guarded region triggers not only the primary operation contemplated in the instruction that makes the reference but an additional user configurable instruction. A load operation that references a region that is guarded is referred to herein as a guarded load. The additional user configurable instructions presently implement garbage collection instructions, which enable garbage collection and heap management while a guarded region is in use in other ways.

For example, a presently available data processing system implements an area of memory that is mapped and registered to the GS Facility as the GS area. A memory management subsystem subdivides this GS area into a set of sections, for example, 64 sections, and provides a masking capability to selectively enable a subset of these 64 sections to be guarded. At the start of a scavenge cycle, the mask corresponding to the allocated space of the area is selectively enabled. During the scavenge cycle, any object references loaded by the application threads are done using a new set of guarded load instructions. When the data processing system executes a guarded load instruction, if the GS facility is enabled, the memory management subsystem determines whether the value being loaded is part of any of the active guarded sections. If the value is part of a guarded region, the GS facility triggers a user configured action, which presently is a method to perform garbage collection in conjunction with accessing the data from the region. At the end of the scavenge cycle, the guarded storage facility is disabled across all threads.

SUMMARY

Embodiments of the invention are defined by the claims below, not this summary A high-level overview is provided here to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

The illustrative embodiments provide a method, system, and computer program product. An embodiment includes a method that loads, during an execution of a code, a first instruction having a first value designating a first region of memory. In this regard, the first instruction is related to a first section of the code. An embodiment determines whether a guarded mode is enabled at the first region. An embodiment triggers a secondary operation, responsive to the guarded mode being enabled at the first region. The secondary operation is in addition to a primary operation of the first instruction. The primary operation is relative to the first region of the memory. The secondary operation causes a profiling of the first section of the code.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3A depicts another block diagram of a data processing system, in accordance with an illustrative embodiment;

FIG. 4C depicts an example of system memory in accordance with an illustrative embodiment;

DETAILED DESCRIPTION

Figure 1:
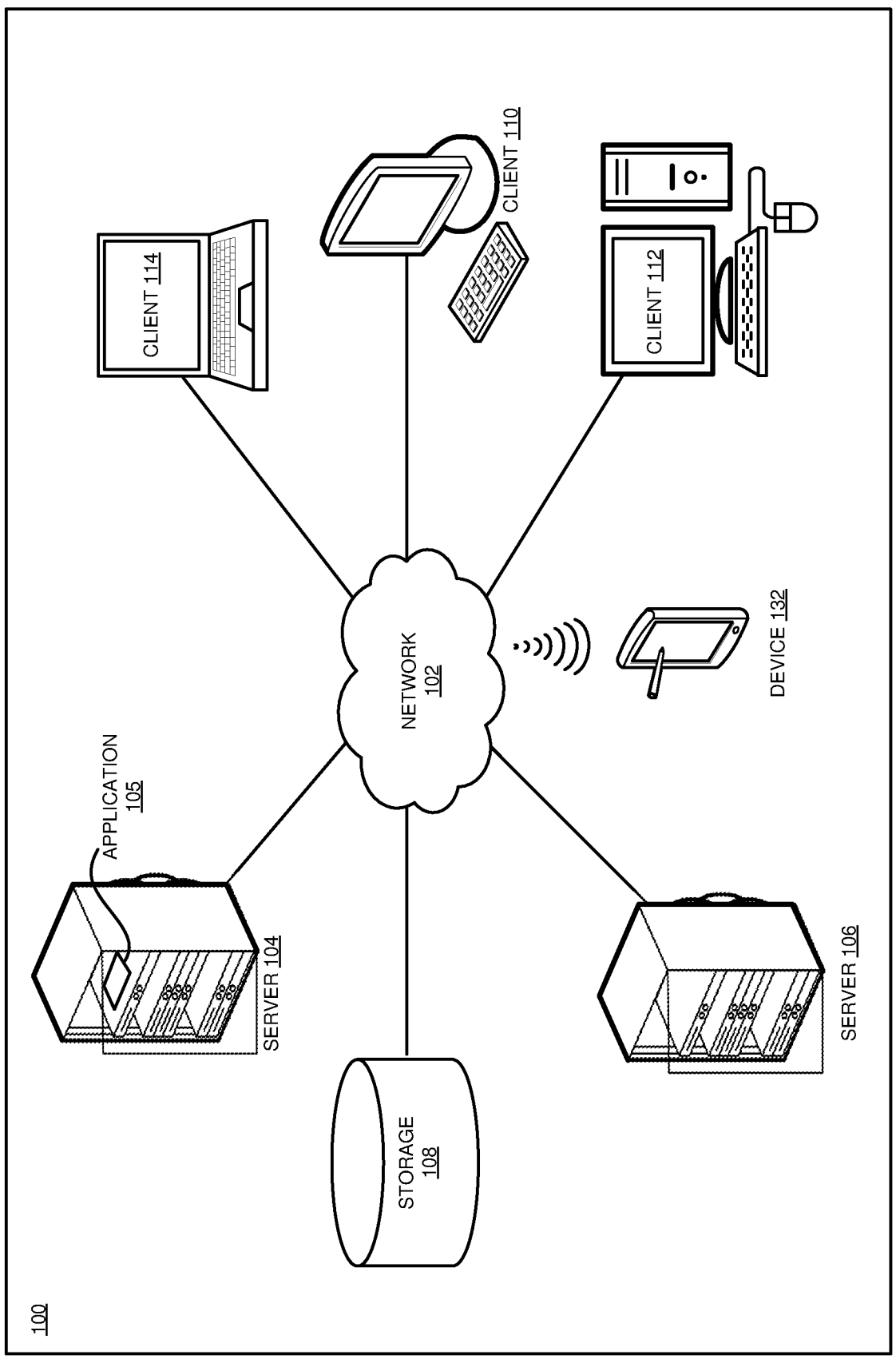
FIG. 1 depicts a block diagram of a network of data processing systems in which illustrative embodiments may be implemented.

The illustrative embodiments recognize that there is a need to reduce the overhead cost of value profiling of a running application. For example, employing a deterministic approach by instrumenting profiling hooks into relevant codepoints that check against a flag to enable or disable profiling, or the use of a counter to trigger the profiling logic produce a non-negligible cost in overhead. This overhead cost is primarily attributed to instrumenting the profiling logic. Moreover, such deterministic approaches also impact application performance. Other approaches leverage hardware interrupts for sampling the executed code, but restrict the data that is collected, as the sampling is limited to the sampling locations. By limiting the sampling locations, the potential for incomplete and/or biased samples increases.

In addition, the use of profiling hooks in current profiling techniques require higher overhead costs because the codepoint checks for an "on" or "off" flag to enable or disable profiling cannot be easily disabled or mitigated.

The illustrative embodiments recognize that the presently available solutions do not address these needs or provide adequate solutions for these needs. The illustrative embodiments used to describe the invention generally address and solve the above-described problems and other problems related to reducing overhead cost of value profiling a running application while providing greater flexibility in the management of profiling operations.

An embodiment can be implemented as a software application. The application implementing an embodiment can be configured as a modification of an existing value profiling system, as a separate application that operates in conjunction with an existing value profiling system, a standalone application, or some combination thereof.

Particularly, some illustrative embodiments provide a method that leverages a guarded storage (GS) facility/ memory manager with instrumented, profiling hooks. The GS facility/memory manager produces lightweight, guarded load instructions, resulting in little to no performance overhead. The additional user configurable instructions contemplated within the scope of the illustrative embodiments can take any suitable form, including but are not limited to invoking an interrupt handler that is configured to cause a profiling operation to occur. Another alternative implementation capable of initializing the profiling operation includes invoking, as a part of triggering the profiling operation, an instruction encoded in a device driver. In this regard, the loading of the first instruction causes the device driver to be invoked, and the invoked device driver causes the profiling operation. Another alternative implementation includes invoking, as part of triggering the profiling operation, an instruction encoded in a memory management subsystem. In this regard, the loading of the first instruction causes the memory management subsystem to start the profiling operation.

According to one embodiment, a first instruction is loaded during an execution of a code. The loaded first instruction is a hook instruction. The first instruction has a first value designating a first region of memory, and the first instruction is related to a first section of the code. Using a guarded storage facility/memory manager (GSF/MM), a determination is made whether a guarded mode is enabled at the first region. This enablement determination can be performed before or during runtime operations. At the GSF/MM, a comparison is made between the received operand indicating the memory address of the loaded instruction and a guarded memory address. If the guarded mode is enabled by the GSF/MM at the first region and the loaded address is a match to a guarded address region, the loaded instruction will perform its primary operation of executing the instruction, as well as the secondary operation of invoking a guarded interrupt handler to handle the profiling operations associated with the executed instruction at the first section of code. In one embodiment, the guarded mode is selectively enabled on a per-thread basis.

In another embodiment, a second instruction different from the first instruction is loaded during the execution of the code. The second instruction has a second value designating a second region of memory, and the second instruction is related to a second section of the code. The second instruction includes a second profiling hook. As with the first instruction, a determination is made by the GSF/MM whether a guarded mode is enabled at the second region. Responsive to the guarded mode being disabled at the second region, the second instruction is notably executed as normal, without the invocation of the interrupt handler and without profiling the second section of code, thus preventing the second profiling hook associated with the second region from performing a guarded action.

In view of the foregoing embodiments, the ability to selectively guard one region and not another allows for greater runtime control of the profiling techniques employed. The above examples of selectively enabling a GSF/MM in such granular fashion so as to cause the invocation of an interrupt handler to handle profiling operations on particular regions of executed code is not meant to be limiting in any way. From this disclosure, those of ordinary skill in the art will be able to conceive many other ways of implementing a profiling operation and the same are contemplated within the scope of the illustrative embodiments.

The manner of value profiling described herein is unavailable in the presently available methods in the technological field of endeavor pertaining to value profiling and code optimization. A method of an embodiment described herein, when implemented to execute on a device or data processing system, comprises substantial advancement of the functionality of that device or data processing system by leveraging the built-in features of a Guarded Storage (GS) facility/ Memory Manager for triggering the execution of value profiling operations.

The illustrative embodiments are described with respect to certain types of computer memories, storage devices, memory managers, profiling systems, profiling hook/instructions, cloud computing systems, virtual computing systems, operating systems, computing systems, server systems, data processing systems, networked computing environments, devices, guarded storage facilities, guarded load instructions, other environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data/instruction, data/ instruction source, or access to a data/instruction source over a data network. Any type of data/instruction storage device may provide the data/instruction to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable computing devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2A:
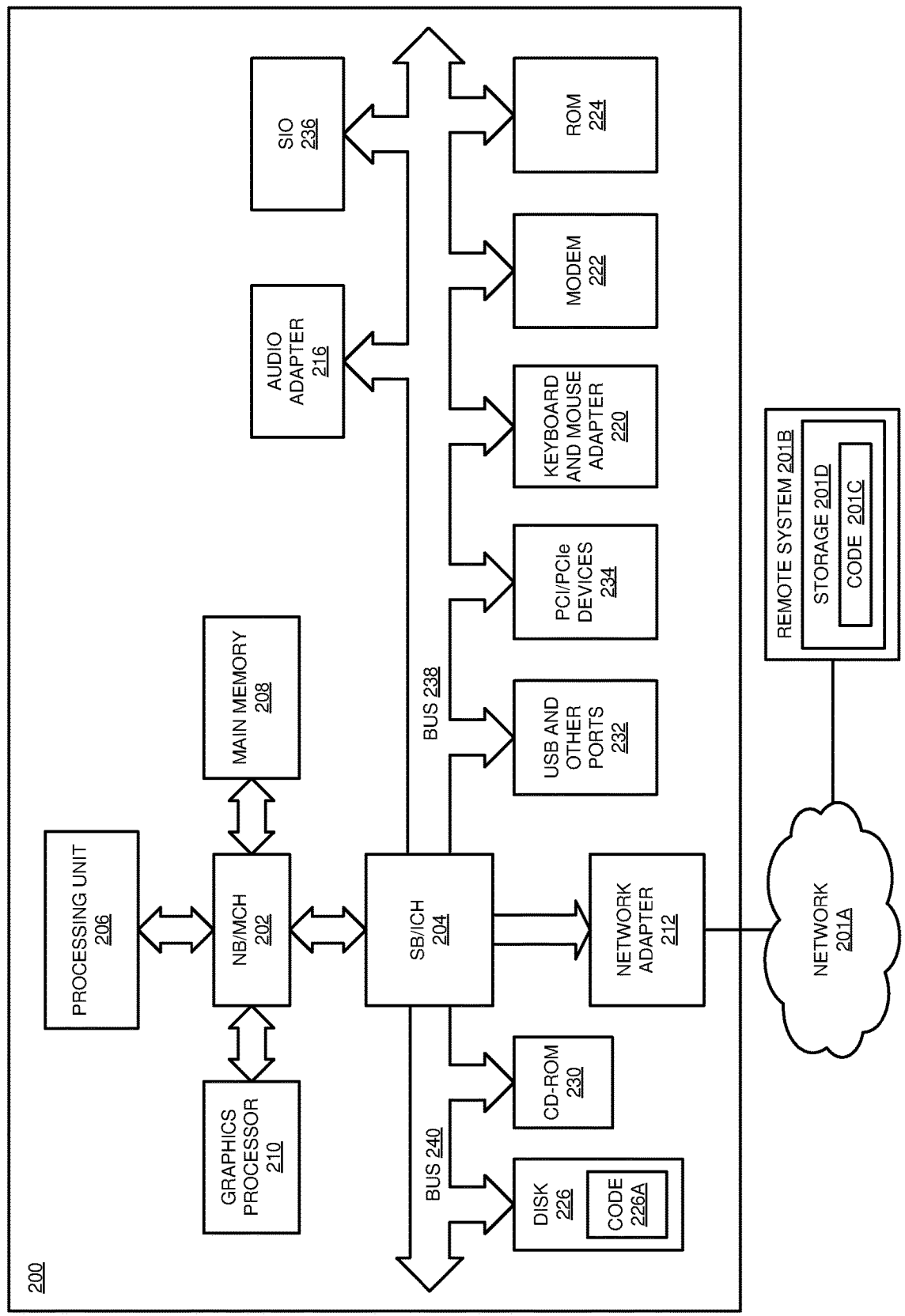
FIG. 2A depicts a block diagram of a data processing system in which illustrative embodiments may be implemented.

With reference to the figures and in particular with reference to FIGS. 1 and 2A, these figures are example diagrams of data processing environments in which illustrative embodiments may be implemented. FIGS. 1 and 2A are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner Any data or information stored or produced in another data processing system in FIG. 1 can be configured to be stored or produced in device 132 in a similar manner.

Application 105 implements an embodiment described herein. Application 105 can also execute in any of data processing systems 104, 106, 110, 112, and 114. Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2A, this figure depicts a block diagram of a data processing system 200 in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2A. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2A may vary depending on the implementation. Other internal hardware or peripheral devices, such as flash memory, equivalent non-volatile memory, or optical disk drives and the like, may be used in addition to or in place of the hardware depicted in FIGS. 1-2A. In addition, the processes of the illustrative embodiments may be applied to a multiprocessor data processing system.

According to one exemplary embodiment, the computing environment 200 and/or remote system 201B is based on the z/Architecture, offered by International Business Machines Corporation, Armonk, N.Y. One embodiment of the z/Architecture is described in "z/Architecture Principles of Operation," IBM Publication No. SA22-7832-11, March 2017, which is hereby incorporated herein by reference in its entirety. Z/ARCHITECTURE is a registered trademark of International Business Machines Corporation, Armonk, N.Y., USA.

The computing environment may also be based on other architectures, including but not limited to, the Intel x86 architectures. Other examples also exist.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2A and above-described examples are not meant to imply architectural limitations. For example, data processing system 200 also may be a tablet computer, laptop computer, or telephone device in addition to taking the form of a mobile or wearable device (not shown).

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 2B:
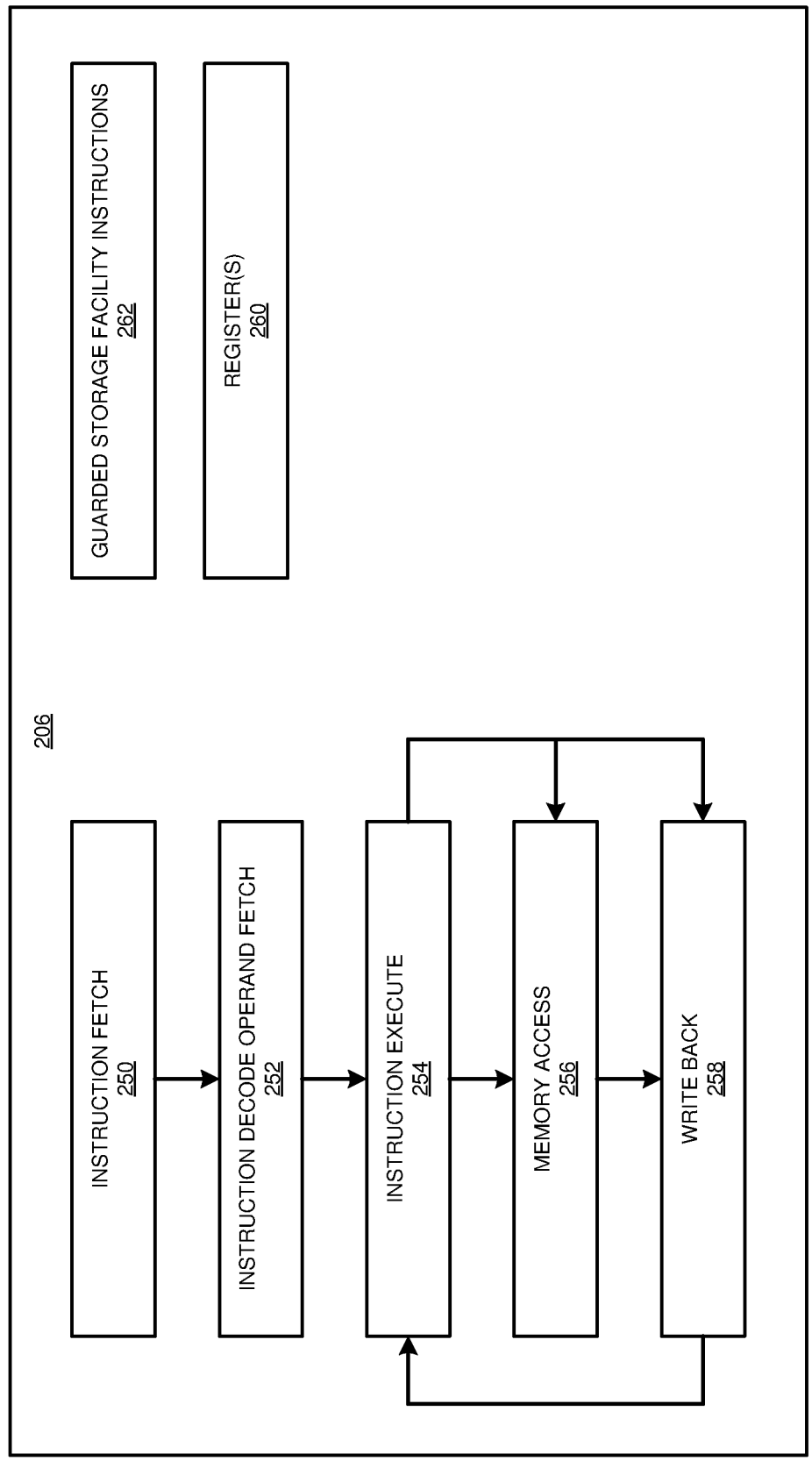
FIG. 2B depicts a block diagram showing further details of the processor of FIG. 2A, in accordance with an illustrative embodiment.

With reference to FIG. 2B, further details regarding one example of processor 206 are described. Processor 206 includes a plurality of functional components used to execute instructions. These functional components include, for instance, an instruction fetch component 250 to fetch instructions to be executed; an instruction decode unit 252 to decode the fetched instructions and to obtain operands of the decoded instructions; instruction execution component 254 to execute the decoded instructions; a memory access component 256 to access memory for instruction execution, if necessary; and a write back component 258 to provide the results of the executed instructions. One or more of these components may, in accordance with an aspect of the present invention, be used to execute one or more instructions 262 of the guarded storage facility/memory manager (GSF/MM; shown subsequently with reference to block 412 of FIG. 4B), described further below.

Processor 206 also includes, in one embodiment, one or more registers 260 to be used by one or more of the functional components.

With reference to FIG. 3A, another embodiment of a computing environment to incorporate and use one or more aspects is described. In this example, a computing environment 300 includes, for instance, a native central processing unit (CPU) 306, a memory 308, and one or more input/ouput devices and/or interfaces 310 coupled to one another via, for example, one or more buses 312 and/or other connections. As examples, computing environment 300 may include a PowerPC processor or a pSeries server offered by International Business Machines Corporation, Armonk, N.Y. and/or other machines based on architectures offered by International Business Machines Corporation, Intel or other companies.

Native CPU 306 includes, one or more native registers 314, such as one or more general purpose registers and/or one or more special purpose registers used during processing within the environment. These registers include information at represents the state of the environment at any particular point in time.

Moreover, native CPU 306 executes instructions and code that are stored in memory 308. In one particular example, the central processing unit executes emulator code 316 stored in memory 308. This code enables the computing environment configured in one architecture to emulate another architecture. For instance, emulator code 316 allows machines based on architectures other than the z/Architecture, such as PowerPC processors, pSeries servers, or other servers or processors, to emulate the z/Architecture and to execute software and instructions developed based on the z/Architecture.

Figure 3B:
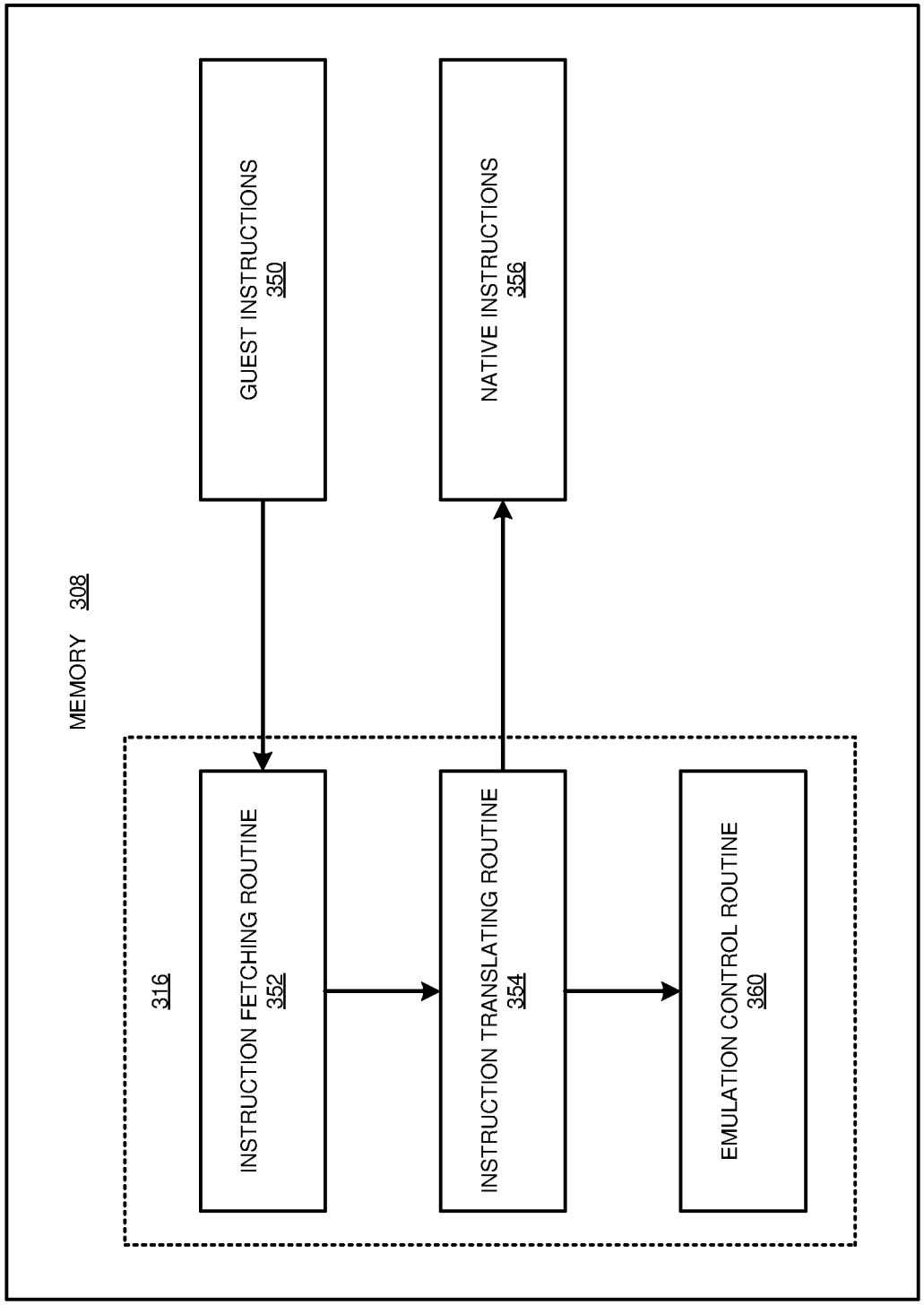
FIG. 3B depicts a block diagram showing further details of the memory of FIG. 3A, in accordance with an illustrative embodiment.

Further details relating to emulator code 316 are described with reference to FIG. 3B. Guest instructions 350 stored in memory 308 comprise software instructions (e.g., correlating to machine instructions) that were developed to be executed in an architecture other than that of native CPU 306. For example, guest instructions 350 may have been designed to execute on a z/Architecture processor, but instead, are being emulated on native CPU 306, which may be, for example, an Intel processor. In one example, emulator code 316 includes an instruction fetching routine 352 to obtain one or more guest instructions 350 from memory 308, and to optionally provide local buffering for the instructions obtained. It also includes an instruction translation routine 354 to determine the type of guest instruction 350 that has been obtained and to translate the guest instruction 350 into one or more corresponding native instructions 356. This translation includes, for instance, identifying the function to be performed by the guest instruction 350 and choosing the native instruction(s) 356 to perform that function.

Further, emulator code 316 includes an emulation control routine 360 to cause the native instructions 356 to be executed. Emulation control routine 360 may cause native CPU 306 to execute a routine of native instructions 356 that emulate one or more previously obtained guest instructions 350 and, at the conclusion of such execution, return control to the instruction fetch routine 352 to emulate the obtaining of the next guest instruction 350 or a group of guest instructions. Execution of native instructions 356 may include loading data into a register from memory 308; storing data back to memory from a register; or performing some type of arithmetic or logic operation, as determined by the translation routine 354.

Each routine is, for instance, implemented in software, which is stored in memory and executed by native CPU 306. In other examples, one or more of the routines or operations are implemented in firmware, hardware, software or some combination thereof. The registers of the emulated processor may be emulated using registers 314 of the native CPU 306 or by using locations in memory 308. In embodiments, guest instructions 350, native instructions 356 and emulator code 316 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 350 that is obtained, translated and executed is, for instance, an instruction of the guarded storage facility/memory manager (GSF/MM)(shown below in FIG. 4B at block 412), a number of which are described herein. The instruction, which is of one architecture (e.g., the z/Architecture), is fetched from memory, translated and represented as a sequence of native instructions 356 of another architecture (e.g., PowerPC, pSeries, Intel, etc.). These native instructions are then executed.

Details relating to one embodiment of a GSF/MM 412, including instructions associated therewith, are described below. The GSF/MM 412 provides a mechanism by which a program can designate an area of logical storage comprising a number of guarded storage sections (e.g., 0 to 64), and may be used, e.g., by various programming languages that implement storage reclamation techniques. The facility includes, for instance, a number of instructions, such as, for example guarded load instructions.

Figure 4A:
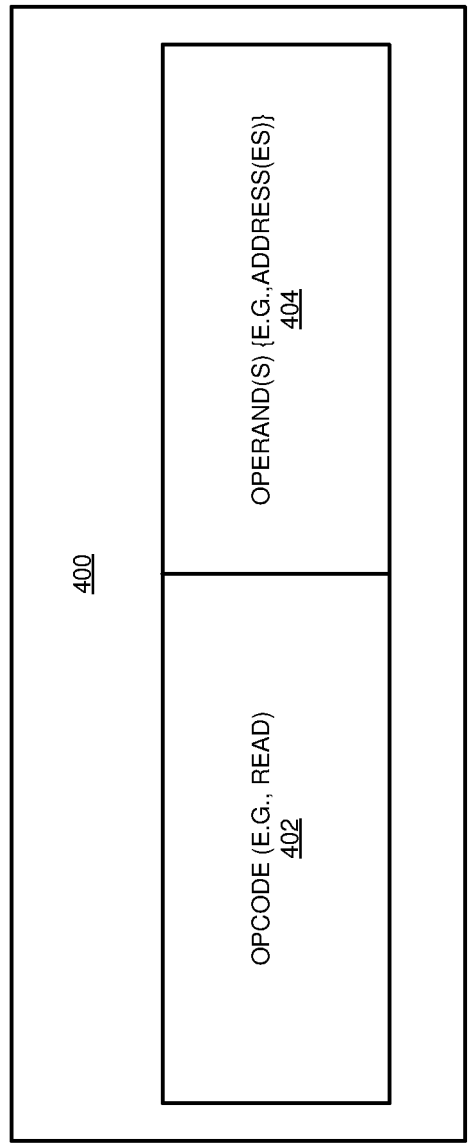
FIG. 4A depicts an exemplary structure of a code instruction in accordance with an illustrative embodiment.

With reference now to exemplary instruction 400 shown in FIG. 4A, the instruction 400 includes an opcode portion 402 (e.g., READ, WRITE, LOAD, etc.) and an operand portion 404 (e.g., a memory address, an indirect reference to a memory address, or even an invalid memory address). When a selected operand, such as one of a guarded load instruction does not designate a guarded section of a guarded storage area, the instruction performs its defined load operation. However, when the operand of the instruction designates a guarded section of the guarded storage area, control branches to a guarded storage event handler, such as interrupt handler 416 of FIG. 4B with indications of the cause of the event. While a guarded load instruction is capable of generating a guarded storage event, other instructions that access a range of guarded storage are unaffected by the facility and do not generate such an event.

Figure 4B:
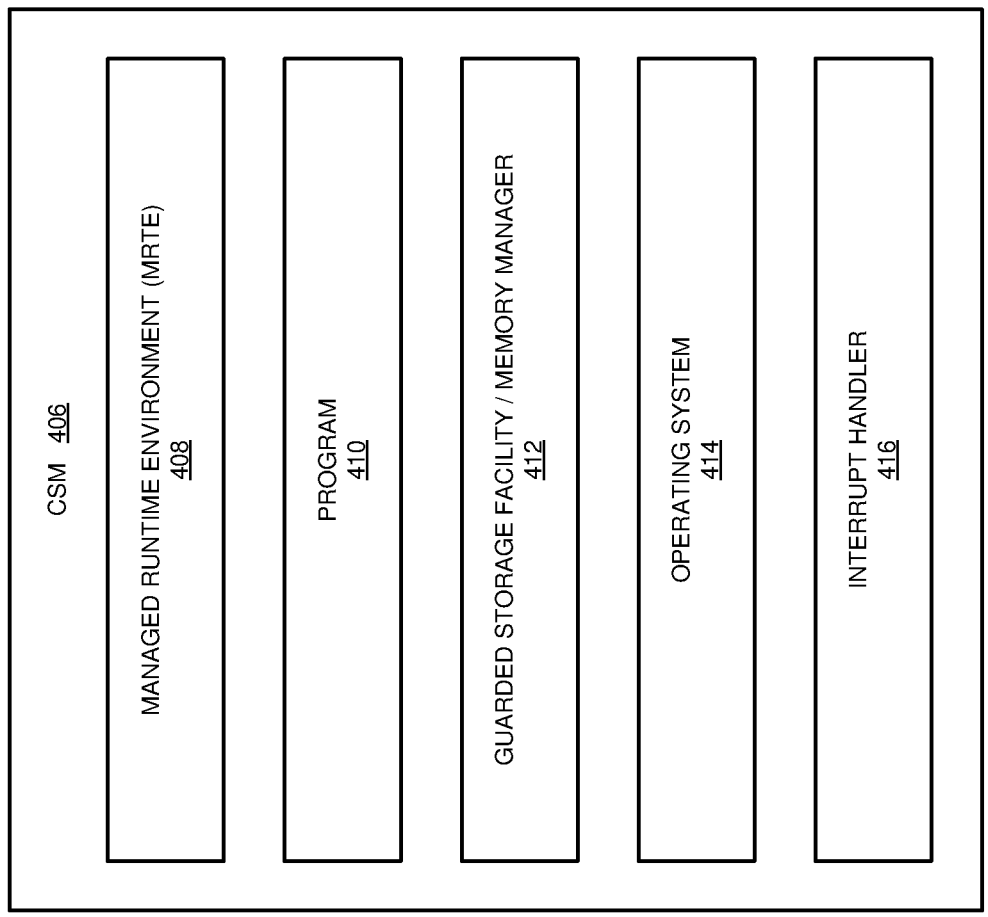
FIG. 4B depicts a block diagram of a computer storage medium (CSM) in accordance with an illustrative embodiment.

With reference now to FIG. 4B, shown is an exemplary embodiment of a computer storage medium (CSM) 406. CSM 406 includes an operating system (OS) 414 that supports a computer's basic functions such as scheduling tasks, executing program(s) 410 (e.g., profiler) that are stored in CSM, a managed runtime environment (MRTE) 408 that includes the targeted instruction thread for execution, the GSF/MM 412 that determines whether a guarded mode is enabled during runtime for a region of memory, and an interrupt handler 416 that handles an interrupt, such as a profiling interrupt, from the executed instruction thread. Details relating to the instructions of the GSF/MM 412 are described further below.

With reference to FIG. 4C, another embodiment of a system memory 418 is shown. System memory 418 includes a first region/range of memory addresses 420 in, e.g., instructions 34-44 and a second region/range of memory addresses 422 in e.g., instructions 45-end. A profiling hook 424 is instrumented before region 420 to check against a flag (not shown) state of GSF/MM 412 indicating whether profiling is enabled/disabled for the region 420.

Figure 4D:
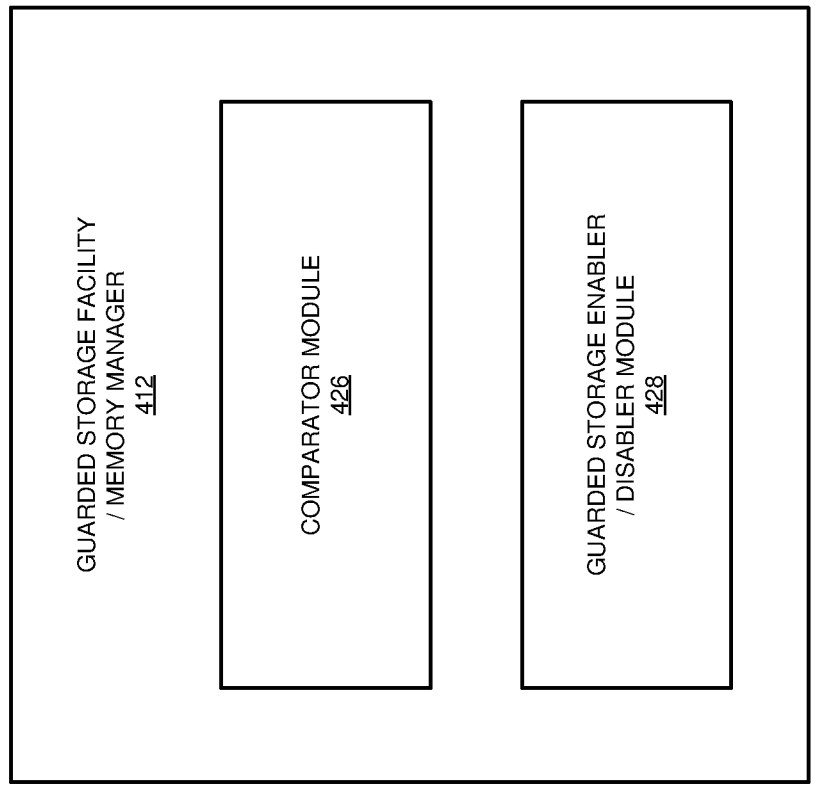
FIG. 4D depicts a block diagram showing further details of the guarded storage facility/memory manager of FIG. 4B, in accordance with an illustrative embodiment.

With reference to FIG. 4D, further detail of the GSF/MM 412 components is shown. GSF/MM 412 includes a comparator module 426, which serves to compare a first value (e.g., memory address) designating a first region of memory, such as region 420, with a second value accessible to the GSF/MM 412 that designates a guarded region of memory for which profiling is performed when GSF/MM 412 is enabled. According to one embodiment, the guarded region may be defined by one or more instruction addresses and combined with other regions of memory to form a single, guarded region of memory. GSF/MM 412 also includes a guarded storage enabler/disabler module 428, which determines whether the GSF/MM 412 is enabled or disabled for a particular region of memory, such that profiling can be performed when the GSF/MM 412 is enabled.

Figure 5:
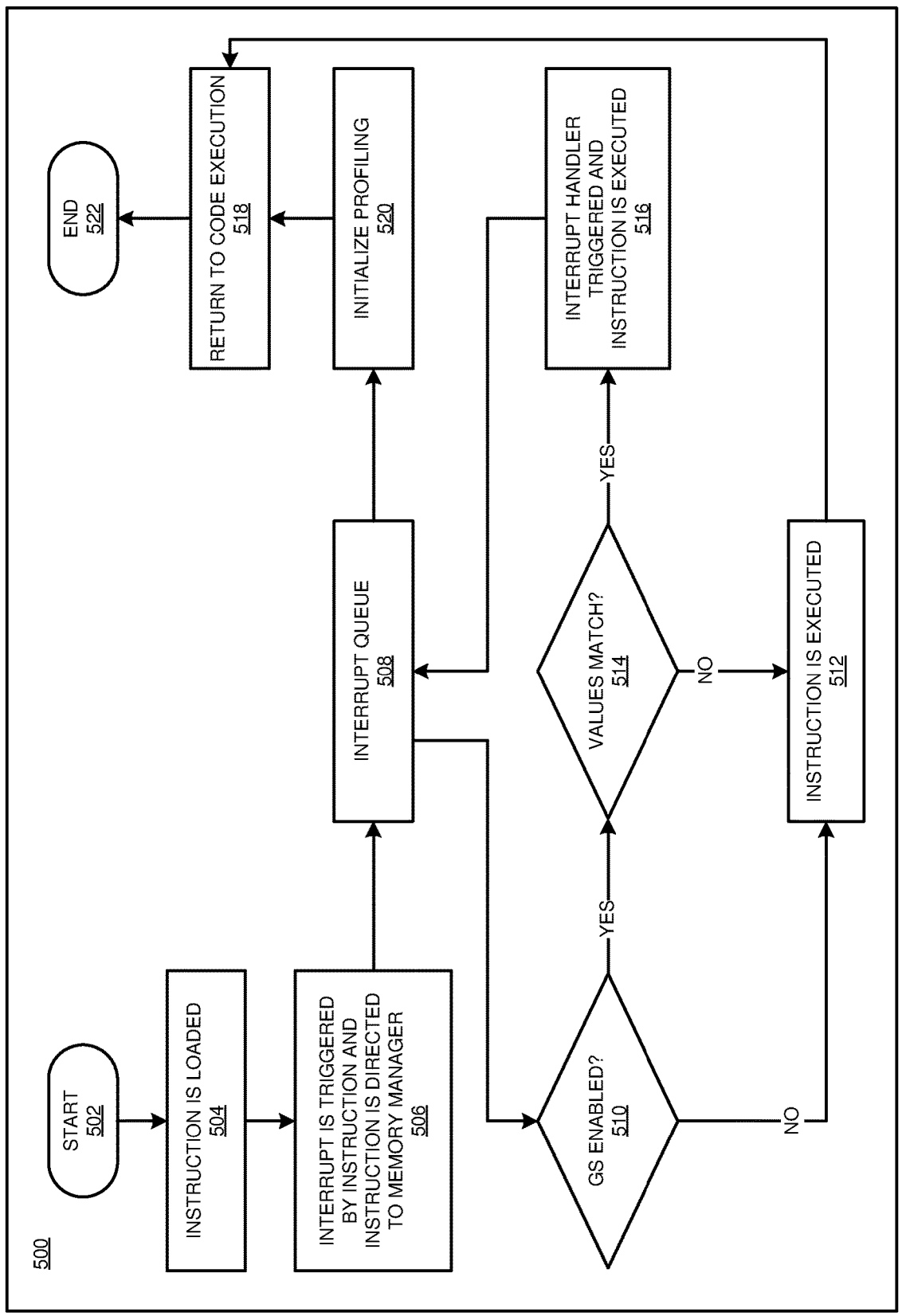
FIG. 5 depicts a flowchart of an example process for value profiling leveraging a guarded storage facility in accordance with an illustrative embodiment.

With reference to FIG. 5, this figure depicts a flowchart of an example process 500 for value profiling that leverages a GSM/MM. Process 500 can be implemented in application 105 of FIG. 1 and can employ the components 408-416 of FIG. 4B. The process begins at block 502 and proceeds to block 504 where an instruction is loaded. In block 506, the loaded instruction triggers an interrupt and the instruction is directed to the GSF/MM and the interrupt is placed in an interrupt queue for handling (block 508). The process proceeds to decision block 510, where guarded storage enabler/disabler module 428 determines whether a guarded mode of GSF/MM 412 is enabled during runtime. If GSF/MM 412 guarded mode is disabled during runtime, the instruction is executed and code execution is returned to MRTE 408 (block 518). If it is determined that GSF/MM 412 guarded mode is enabled, the process flows from decision block 510 to decision block 514, where comparator module 426 of GSF/MM 412 compares the values (e.g., address value vs. guarded address value) to determine whether profiling will be performed on a matched region. If the values do not match, the instruction will not trigger the interrupt handler 416 (block 516), but the instruction is still executed and code execution is returned to MRTE 408 (block 518). However, if the values match at block 514, the interrupt handler 416 is triggered and the instruction is executed (block 516). From block 516, flow continues to block 518, where the triggered interrupt in the queue 508 is taken up for handling and process continues to block 520 where profiling instructions are initialized to collect profiling data from the executed instructions identified as belonging to the guarded region that is executed. According to an embodiment, the interrupt handler is a pre-configured profiling handler that controls a full register state to extract targeted profiling values. From block 520, code execution returns at block 518 and the process ends at block 522.

Thus, a computer implemented method, system or apparatus, and computer program product are provided in the illustrative embodiments for software-directed value profiling with hardware-based guarded storage facility and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    guarding, selectively to allow for value profiling, a region of memory resulting in a guarded region of memory, the guarded region of memory including a guarded memory address;
    loading, during an execution of a code, a first instruction having a first operand, wherein the first operand includes a first value designating a first memory address, the first instruction being related to a first section of the code;
    queuing, in an interrupt queue, an interrupt that is triggered by the loading of the first instruction;
    determining, while the interrupt remains queued in the interrupt queue, that the first operand designates guarded memory by comparing the first memory address to the guarded memory address; and
    performing, responsive to determining that the first operand designates guarded memory, a primary operation and a secondary operation,
    wherein the primary operation comprises executing the first instruction, and
    wherein the secondary operation comprises invoking an interrupt handler that takes the interrupt from the interrupt queue and initializes value profiling of the first section of code in the guarded region of memory.

2. The computer-implemented method of claim 1, further comprising:
loading, during the execution of the code, a second instruction having a second operand, wherein the second operand includes a second value designating a second memory address, the second instruction being related to a second section of the code;
determining that the second operand designates unguarded memory by comparing the second memory address to a guarded memory address; and
responsive to determining that the second operand designates unguarded memory, executing a primary operation of the second instruction without triggering the secondary operation.

3. The computer-implemented method of claim 2, wherein the designating of the unguarded memory by the second operand prevents a profiling hook from performing a guarded action.

4. The computer-implemented method of claim 1, wherein the interrupt handler is a pre-configured profiling handler that controls a full register state to extract targeted profiling values.

5. The computer-implemented method of claim 1, wherein the first memory address is in the guarded region of memory.

6. The computer-implemented method of claim 1, wherein the first value is an indirect reference to the first memory address in the region of memory.

7. The computer-implemented method of claim 1, wherein the first value designates an invalid memory address.

8. The computer-implemented method of claim 1, wherein the region of memory is selectively guarded on a per-thread basis.

9. The computer-implemented method of claim 1, wherein the region of memory is unguarded at run-time.

10. The computer-implemented method of claim 1, wherein the region of memory is guarded at run-time.

11. The computer-implemented method of claim 1, further comprising:
enabling a guarded mode of a guarded storage facility (GSF).

12. The computer-implemented method of claim 11, further comprising:
determining, while the interrupt remains queued in the interrupt queue, that the guarded mode of the GSF is enabled.

13. The computer-implemented method of claim 12, wherein the determining that the first operand designates guarded memory is responsive to the determining that the guarded mode of the GSF is enabled.

14. The computer-implemented method of claim 11, further comprising:
translating a guest instruction to the first instruction.

15. The computer-implemented method of claim 14, wherein the translating of the guest instruction comprises translating the guest instruction from a non-native central processing unit (CPU) architecture to a native CPU architecture resulting in the first instruction.

16. The computer-implemented method of claim 14, wherein the guest instruction is an instruction of the GSF.

17. A computer usable program product comprising one or more computer-readable storage devices, and program instructions stored on at least one of the one or more storage devices, the stored program instructions comprising:

program instructions to guard, selectively to allow for value profiling, a region of memory resulting in a guarded region of memory, the guarded region of memory includes a guarded memory address;
program instructions to load, during an execution of a code, a first instruction having a first operand, wherein the first operand includes a first value designating a first memory address, the first instruction being related to a section of the code;
program instructions to queue, in an interrupt queue, an interrupt that is triggered by the loading of the first instruction;
program instructions to determine, while the interrupt remains queued in the interrupt queue, that the first operand designates guarded memory by comparing the first memory address to the guarded memory address; and
program instructions to perform, responsive to determining that the first operand designates guarded memory, a primary operation and a secondary operation,
wherein the primary operation comprises executing the first instruction, and
wherein the secondary operation comprises invoking an interrupt handler that takes the interrupt from the interrupt queue and initializes value profiling of the section of code in the guarded region of memory.

18. The computer usable program product of claim 17, wherein the computer usable code is stored in a computer readable storage device in a data processing system, and wherein the computer usable code is transferred over a network from a remote data processing system.

19. The computer usable program product of claim 17, wherein the computer usable code is stored in a computer readable storage device in a server data processing system, and wherein the computer usable code is downloaded over a network to a remote data processing system for use in a computer readable storage device associated with the remote data processing system.

20. A computer system for value profiling, the computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to guard, selectively to allow for value profiling, a region of memory resulting in a guarded region of memory, the guarded region of memory includes a guarded memory address;
program instructions to load, during an execution of a code, a first instruction having a first operand, wherein the first operand includes a first value designating a first memory address, the first instruction being related to a section of the code;
program instructions to queue, in an interrupt queue, an interrupt that is triggered by the loading of the first instruction;
program instructions to determine, while the interrupt remains queued in the interrupt queue, that the first operand designates guarded memory by comparing the first memory address to the guarded memory address; and
program instructions to perform, responsive to determining that the first operand designates guarded memory, a primary operation and a secondary operation, wherein the primary operation comprises executing the first instruction, and wherein the secondary operation comprises invoking an interrupt handler that takes the interrupt from the interrupt queue and initializes value profiling of the section of code in the guarded region of memory.

\* \* \* \* \*